United States Patent [19]

Black

[11] 4,161,893
[45] Jul. 24, 1979

[54] ROTARY INDEXING MECHANISM

[75] Inventor: John W. Black, Hickory Corners, Mich.

[73] Assignee: Pemco-Kalamazoo, Inc., Kalamazoo, Mich.

[21] Appl. No.: 723,925

[22] Filed: Sep. 16, 1976

[51] Int. Cl.² ............................................ B23Q 17/00
[52] U.S. Cl. ................................. 74/813 R; 74/813 C
[58] Field of Search ......................... 74/813 R, 813 C; 29/35.5, 48.5 R, 49

[56] References Cited

U.S. PATENT DOCUMENTS 3,085,452  4/1903  Thompson ......................... 74/813 X Primary Examiner—Alan Cohan
Attorney, Agent, or Firm—Blanchard, Flynn, Thiel, Boutell & Tanis

[57] ABSTRACT

An indexing mechanism having a base and a cyclical drive unit mounted on the base and connected through a connecting member to a driven member which is supported on and for movement relative to the base. The connecting member has a coupling arrangement thereon which is movable into and out of engagement with the driven member. A control is provided for effecting a simultaneous (1) coupling by the coupling arrangement of the drive member to the driven member and (2) driving of the driven member by the drive member in one direction and a simultaneous uncoupling of the coupling arrangement to (1) uncouple the drive member from the driven member and (2) to drive the drive member in an opposite direction relative to the driven member. The coupling arrangement includes a slip clutch device and the coupling force of the slip clutch device is adjustable to provide a sufficient drive of the driven member but cause slippage to occur if resistance is encountered which prevents a movement of the driven member in response to the drive therefor.

11 Claims, 7 Drawing Figures

ROTARY INDEXING MECHANISM

FIELD OF THE INVENTION

This invention relates to an indexing mechanism and, more particularly, to a mechanism which advances a driven member a predetermined distance during one-half cycle of operation and then returns to the original position while leaving the driven member at the indexed location.

BACKGROUND OF THE INVENTION

This invention arose out of the need for a mechanism for advancing a rotatable turntable in an assembling machine but is not to be considered as being limited thereto. The rotatable turntable has a substantial mass and difficulty was encountered in accelerating and decelerating the table movement without effecting damage to the drive mechanism incorporated in the indexing mechanism during acceleration and deceleration thereof. In addition, and in view of the large mass of the turntable, it was necessary to eliminate the unusually high forces that would develop on conventional indexing mechanism which would engage the turntable at only one location thereon. In an effort to effectively drive the turntable, a positive connection has heretofore been provided between the drive and driven members. If an obstruction halting movement of the turntable occurred, the positive connection or the driven structure could seriously be damaged. As a result, a need arose for an indexing mechanism which would eliminate the aforementioned problems and provide for a durable and maintenance free operation.

Accordingly, it is an object of this invention to provide an indexing mechanism which uniformly applies a force to the driven member to effect an acceleration and deceleration of the turntable between indexed positions thereof.

It is a further object of this invention to provide an indexing mechanism, as aforesaid, wherein the connecting arrangement between the drive member and the driven member is mounted on the driven member and supported for movement relative thereto so that the drive member does not support the connecting arrangement connecting the drive member to the driven member.

It is a further object of this invention to provide an indexing mechanism, as aforesaid, wherein the driven member is driven at a velocity which is sinusoidal in nature so that the stresses applied to the supporting structure for the turntable is minimized during acceleration and deceleration thereof.

It is a further object to provide an indexing mechanism having a built in slip clutch, which clutch protects the indexing mechanism and the driven members in case of the appearance of outside members which would tend to inhibit the indexing of the driven member and consequently cause damaging or distructive forces to be applied to the indexing mechanism or the driven member.

It is a further object of the invention to provide an indexing mechanism, as aforesaid, wherein the spacing between indexed steps can be easily altered, the direction of movement of the driven member can be easily altered so that the indexing mechanism is adaptable to use with many different type work situations requiring an indexing operation.

It is a further object of this invention to provide an indexing mechanism as aforesaid, which is durable and essentially maintenance free.

SUMMARY OF THE INVENTION

The objects and purposes of the invention are met by providing an indexing mechanism having a base and cyclical drive means mounted on the base and driven means supported on and for movement relative to the base. Connecting means are supported on the driven means and supported for movement relative thereto for connecting the cyclical drive means to the driven means. The connecting means includes coupling means movable into and out of engagement with the driven means. Control means are provided for effecting a simultaneous coupling of the drive means to the driven means and a driving of the driven means by the drive means in one direction and a simultaneous uncoupling of the drive means from the driven means and a driving of the drive means in an opposite direction relative to the driven means.

BRIEF DESCRIPTION OF THE DRAWINGS

Other objects and purposes of this invention will be apparent to persons skilled in the art upon reading the following specification and inspecting the accompanying drawings, in which.

Figure 1:
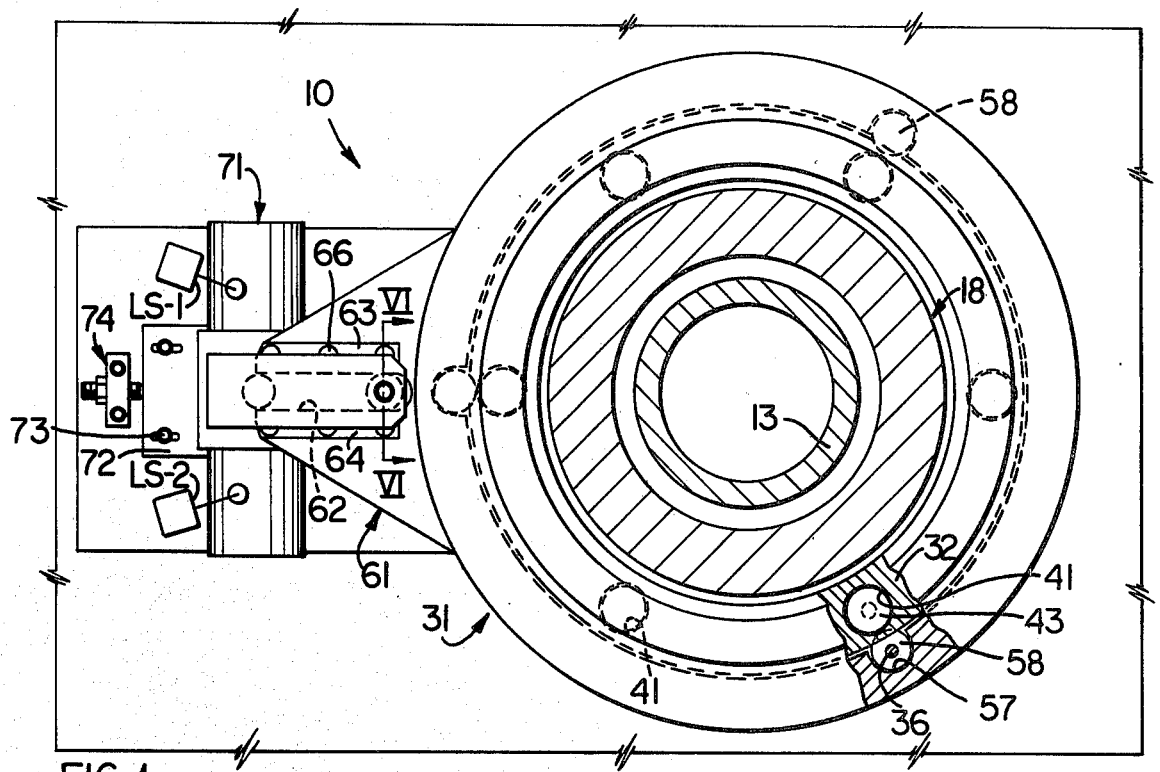
FIG. 1 is a top view of the indexing mechanism embodying the invention taken along the line I—I of FIG. 2.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. Such terminology will include derivatives and words of similar import.

DETAILED DESCRIPTION

Figure 2:
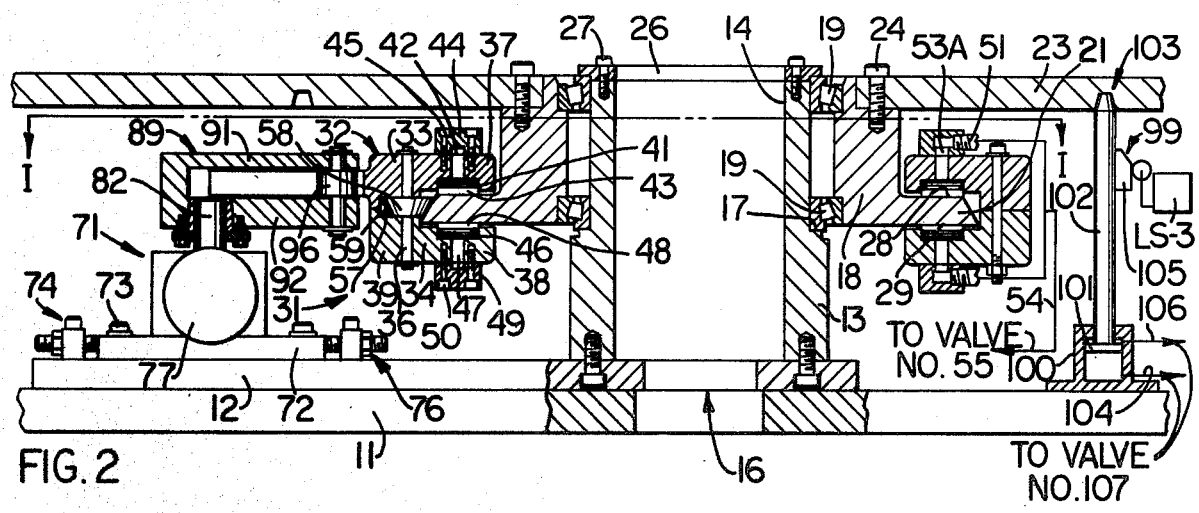
FIG. 2 is a central sectional view of the indexing mechanism.

The indexing mechanism 10 is illustrated in FIGS. 1 and 2 and comprises a base plate 11 and a mounting plate 12 mounted on the upper surface of the base plate 11, which mounting plate 12 supports a central upstanding post 13 thereon. The post 13 has a central opening 14 therein which opens downwardly through the mounting plate 12 and base plate 14 through aligned openings 16 therein. The outer periphery of the post 13 has an upwardly facing lip 17 thereon spaced upwardly from the upper surface of the mounting plate 12.

An annulus 18 encircles the post 13 above the upwardly facing lip 17 and has bearings 19 disposed between the radially inner surface of the annulus 18 and the outer periphery of the upper portion of the post 13 to rotatably support the annulus 18 with respect to the post 13. The lowermost bearing 19 is supported on the upwardly facing lip 17.

The annulus 18 has a radially outwardly extending annular flange 21 having an upper surface 28 and a lower surface 29 thereon. The outermost edge of the flange 21 is inclined upwardly or beveled as at 22. In this particular embodiment, the top edge of the incline of the beveled edge 22 is closer to the axis of rotation for the annulus 18 and the lower edge thereof is spaced further away from the axis of rotation of the annulus 18.

A table 23 is secured to the annulus 18 by a plurality of screws 24. A bearing cap 26 is mounted to the upper end of the post 13 and is secured thereto by a plurality of screws 27 to effect a locking of the bearings 19 and annulus 18 to the post 13.

A connecting member 31 is comprised of an annular ring 32 having a generally C-shaped cross section. In this particular embodiment, the annular ring 32 is composed of an upper section 33 and a lower section 34 secured together by a bolt 36. The C-shaped cross section of the annular ring has a pair of horizontally extending and parallel legs 37 and 38 which straddle the flange 21 and are spaced from each other a distance which is slightly greater than the thickness of the flange 21. A bight portion 39 connects the legs 37 and 38.

A plurality of recesses 41, in this particular embodiment, a circular recess (FIG. 1) are provided in the surface of the leg 37 of the annular ring 32 which faces the upper surface 28 of the annular flange 21. Passageways 42 extend through the leg 37 and provides communication between each of the recesses 41 and an annular feed ring 44 which is secured to the upper surface of the leg 37 by a plurality of screws 45. A friction member or pad 43 is reciprocally disposed in each of the recesses 41 for movement into and out of engagement with the upper surface 28 of the flange 21. A plurality of similar recesses 46 are provided in the surface of the leg 38 of the annular ring 32 which faces the lower surface 29 of the annular flange 21 and are opposed to the recesses 41. The recesses 46 are circular in cross section and a passageway 47 extends through the leg 38 to provide communication between each of the recesses 46 and an annular feed ring 49 which is secured to the lower surface of the leg 38 by a plurality of screws 50. A friction member or pad 48 is reciprocally disposed in each of the recesses 46 for movement into and out of engagement with the lower surface 29 of the flange 21.

A threaded connector 51 is connected to the feed ring 44 through a passageway 53A to the plurality of passageways 42 in the leg 37 of the annular ring 32. Similarly, a threaded connector 52 is connected through a passageway 53B in the feed member 49 to provide communication with the plurality of passageways 47 in the lower feed ring 49. The threaded connectors 51 and 52 are coupled to a conduit 54 which is connected to a port on a solenoid operated valve 55 (FIG. 7) supplied with a pressurized fluid medium from a source 56. An adjustable valve 60 is connected in the line between the source 56 and the valve 55 to control the pressure of the fluid medium supplied to the recesses 41 and 46 and the pads 43 and 48, respectively, therein. The valve 60 permits the friction force between the pads 43 and 48 and the flange 21 to be regulated to define a slip clutch if a force is generated inhibiting the motion of the driven annulus 18.

An annular recess 57 is provided in the bight portion 39 of the annular ring 32 and is generally aligned with and faces the radially outer edge of the annular flange 21. A beveled roller 58 is rotatably mounted in the recess 57 and the axle for the roller 58 is the bolt 36. The inclined peripheral surface 59 on the roller 58 is inclined at the same angle as the outer beveled edge 22 on the flange 21. A plurality of such rollers 58 are mounted around the periphery of the connecting member 31 and the inclined surface 22 on the flange 21 and the inclined surfaces 59 on the rollers 58 serve to cause the center of the annular ring 32 to be located at a position which is coaxial with the axis of the annulus 18. In addition, the position of the bolts 36, which define the axles for each of the rollers 58, are positioned on the annular ring 32 so that the roller 58 will maintain a spacing between the lower surface of the leg 37 and the upper surface 28 of the flange 21 and a spacing between the lower surface 29 of the flange 21 and the upper surface of the leg 38. However, the friction members or pads 43 and 48 will slidingly engage the surfaces 28 and 29, respectively, of the annular flange 21 but with a minimum of frictional resistance when the recesses 41 and 46 therefor have not been pressurized by fluid medium.

A flange 61 projects radially outwardly from the annular ring 32. In this particular embodiment, the flange 61 is generally triangularly-shaped as illustrated in FIG. 1 with the base of the triangle being connected to the annular ring 32 and the apex of the triangle being spaced radially outward away from the periphery of the annular ring 32. A slot 62 is provided in the flange 61 and extends generally radially of the annular ring 32 from the apex of the triangular-shaped flange 61 to a location terminating radially outwardly of the outer periphery of the annular ring 32. The walls of the slot 62 are lined with L-shaped wear plates 63 and 64 (FIG. 6) wherein the vertical legs of the wear plates 63 and 64 are parallel with the walls of the slot 62 and the horizontal legs of the wear plates 63 and 64 are recessed into the upper surface of the flange 61 and are secured in position by a plurality of screws 66. The wear plates 63 and 64 can be of a hardened material thereby eliminating a need to harden a portion of the flange 61. As a result, the upper section 33 and the lower section 34 of the annular ring 32 can be cast components with a minimum of machining being necessary to effect the fabrication of the indexing mechanism 10.

The drive mechanism 71 for the index mechanism 10 is comprised of an adjusting plate 72 which is mounted on the upper surface of the mounting plate 12. The adjusting plate 72 is movable relative to the mounting plate 12 and is guided for movement by a plurality of screws 73 which are received in slotted holes in the adjusting plate 72 as illustrated in FIG. 1. Adjusting mechanisms 74 and 76 are provided adjacent the ends of the adjusting plate 72 to effect an adjustment of the adjusting plate 72 in directions parallel to the axes of the slotted holes into which the screws 73 are received.

The drive mechanism 71 is a conventional commercially available arrangement having a cylinder 77 having a pair of ports 78 and 79 (FIG. 3) in the axial ends thereof and another port 81 intermediate the axial ends of the cylinder 77. An output shaft 82 is rotatably supported in the cylinder 77 and the axis of the output shaft extends perpendicular to the longitudinal axis of the cylinder 77. A gear 83 is fixedly secured to the output shaft 82 in the cylinder 77. A piston 84 is reciprocally mounted in the cylinder 77 between the gear 83 and the port 78. A gear rack 86 is fixedly connected to the piston 84 and is movable therewith. Similarly, a second piston is reciprocally mounted in the cylinder 77 between the gear 83 and the port 79. A gear rack 88 is fixedly secured to the piston 87 and is movable therewith. The gear racks 86 and 88 simultaneously engage diametrically opposite parts of the gear 83 so that the gear 83 will be rotated in response to pressure medium being supplied to or exhausted from the chambers between the piston 84 and port 78 and the piston 87 and port 79.

Figure 7:
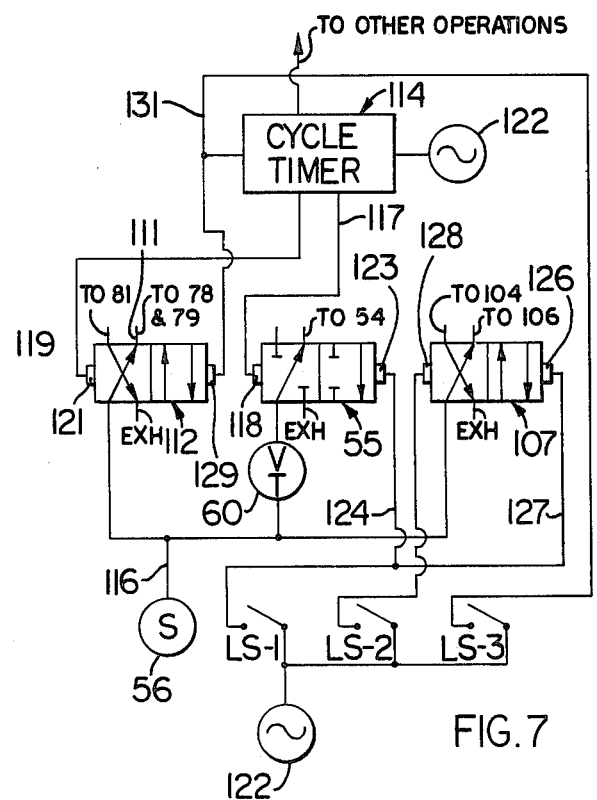
FIG. 7 is a schematic electrical and fluid circuit diagram for the indexing mechanism.

In this particular embodiment, the ports 78 and 79 are connected together through a conduit 111 which is connected to one port of a solenoid operated valve 112 to which is supplied a pressurized fluid medium from the source 56 (FIG. 7).

Figure 6:
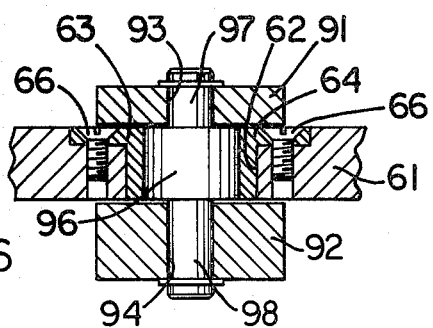
FIG. 6 is a sectional view taken along the line VI—VI of FIG. 1.

A lever arm 89 is connected to the output shaft 82 from the drive mechanism 71 and is fixed thereto for movement therewith. The lever arm 89 has a pair of vertically spaced plates 91 and 92 which straddle the flange 61 as illustrated in FIGS. 2 and 6. The upper plate 91 has an opening 93 (FIG. 6) therethrough and the lower plate 92 has an opening 94 therethrough axially aligned with the opening 93 in the upper plate 91. A roller 96 is disposed between the upper plate 91 and the lower plate 92 and the roller has a pair of axially aligned shafts 97 and 98 which are received in the axially aligned openings 93 and 94. Conventional securing devices are provided on the shafts 97 and 98 to maintain the roller 96 centered between the plates 91 and 92. A pair of normally open limit switches LS-1 and LS-2 (FIG. 1) are mounted on the cylinder 77 so that one is positioned adjacent the opposite ends of the path of movement of the lever arm 89 and are each engaged thereby.

A locking device 99 is provided for locking the turntable 23 in fixed locations corresponding to desired index locations. The locking device 99 is comprised of a cylinder 100 mounted on the base plate 11, for example, which cylinder 100 reciprocally supports a piston 101 therein. The piston 101 has an axially extending pin connected thereto with a tapered upper end and extending outwardly of the cylinder 100. The undersurface of the turntable 23 can be provided with structure for defining a recess 103, such as a plurality of drilled holes or other equivalent structure and adapted to receive the free end of the pin 102 therein. The taper on the end of the pin permits the pin to effect an incremental adjustment of the turntable during entry thereof into the recess 103 to accurately position the turntable at the desired location. A cam 105 is mounted on the pin 102 and cooperates with a limit switch LS-3. The limit switch LS-3 is normally opened and is closed only when the tapered end of the pin 102 is received in the recess 103.

A fluid pressure medium is supplied to the cylinder 100 at the upper side of the piston 101 through a conduit 106 which extends to one terminal on a solenoid operated valve 107. The valve 107 is supplied with pressure fluid medium from the source 56. A fluid pressure medium is supplied to the cylinder 100 at the lower side of the piston 101 through a conduit 104 which extends to a second terminal on the valve 107 (FIG. 7).

A cycle timer 114 is provided for controlling the operation of the valves 55, 107 and 112. The timer 114 can be of any conventional type, such as a rotatably driven timing motor having a plurality of cams on the output shaft thereof which sequentially open and close limit switches for controlling the solenoids on the respective valves to effect desired timing sequence therebetween. The timer 114 also controls the operation of devices associated with the equipment mounted on the turntable.

Referring now to FIG. 7, the pressurized fluid medium source 56 is connected through a conduit 116 to the input ports to each of the valves 55, 107 and 112. The connection to the valve 55 is through a pressure adjusting valving 60. An output terminal of the cycle timer 114 is connected through a line 117 to the solenoid 118 on the valve 55. A second output terminal of the cycle timer is connected through a line 119 to the solenoid 121 in the valve 112. A source of electrical energy 122 is supplied to the cycle timer 114 to effect energization of the respective solenoids. The same source of energy 122, if desired, is connected through the limit switch LS-1 to the solenoid 123 on the end of the valve 55 remote from the solenoid 118 through a line 124 and to the solenoid 126 on the valve 107 through the line 127. The source of energy 122 is connected through the limit switch LS-2 to the solenoid 128 on the end of the valve 107 remote from the solenoid 126. The source of energy 122 is connected through the limit switch LS-3 to the "START" terminal of the timer 114 and to the solenoid 129 on the end of the valve 112 remote from the solenoid 121 through a line 131.

OPERATION

Although the operation of the mechanism described above will be understood from the foregoing description by skilled persons, a summary of such description is now given for convenience.

Figure 4:
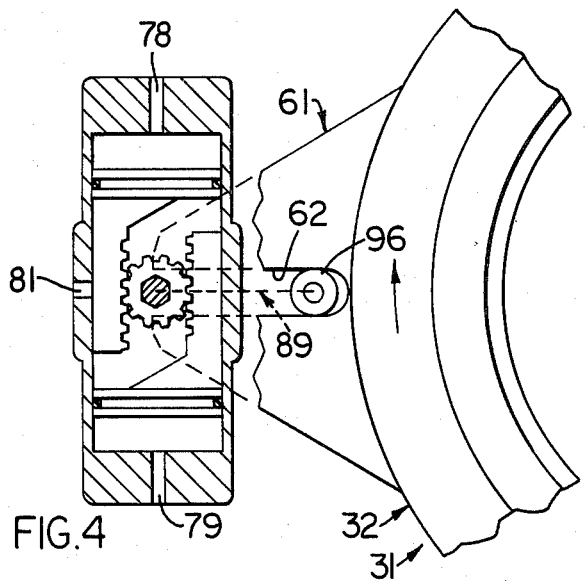
FIG. 4 is a fragmentary view similar to FIG. 3 with the connecting member in an intermediate position.
Figure 5:
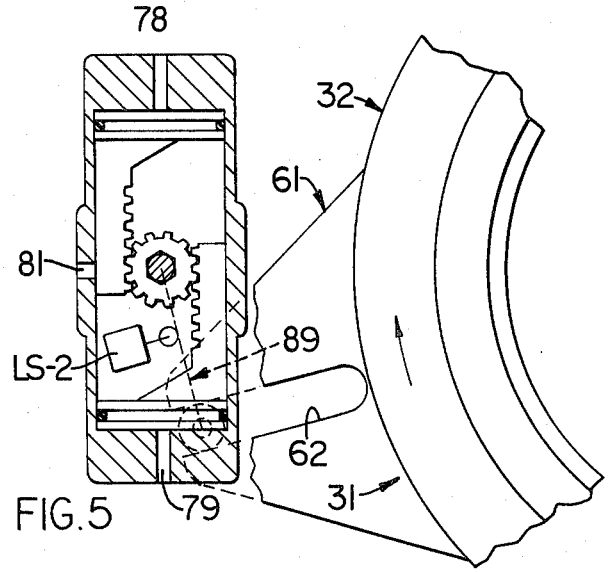
FIG. 5 is a fragmentary view similar to FIGS. 3 and 4 with the connecting member in another position.

It will be assumed, for purposes of description, that the indexing motion of the rotatable table 23 is in a clockwise direction as viewed in FIG. 1. In this position, the flange 61 will be in the position illustrated in FIG. 5. In addition, and in the at rest condition, the pin 102 is in the retracted position. After a desired operation has been performed in apparatus mounted on the table 26 and it is time to effect an indexing of the table to the next position, the timer control 114 will time out and simultaneously effect an energization of the solenoid 118 through line 117 and a shifting of the valve 55 to the position illustrated in FIG. 7. As a result, the source 56 will supply pressurized fluid medium through the conduit 54 and pressure adjusting valve 60 to each of the recesses 41 and 46 on the annular ring 32 to cause a friction-tight engagement of the friction members 43 and 48, respectively, with the upper and lower surfaces 28 and 29, respectively, of the annular flange 21. The amount of friction-tight engagement is controlled by the valve 60. Shortly thereafter, approximately one-fourth of a second, and after the pressure has built up to the desired level in the recesses 41 and 46, the timer 114 effects an energization of the solenoid 121 through the line 119 to effect a shifting of the valve 112 to the position shown in FIG. 7. Pressurized fluid medium will be supplied from the source 56 through the valve 112 and conduit 111 to the ports 78 and 79 (FIG. 5) of the cylinder 77. A pressurization of the opposed end surfaces of the pistons 84 and 87 will effect a movement of the pistons 84 and 87 toward each other to effect a movement of the pistons from the FIG. 5 position through the FIG. 4 position toward the FIG. 3 position. This movement will effect a counterclockwise rotation of the gear 83 and a corresponding counterclockwise movement of the lever arm 89. As a result of this movement, the roller 96 will move in the slot 62 in the flange 61 to an intermediate position illustrated in FIG. 4 and subsequently to the endmost position illustrated in FIG. 3 to effect a closing of the limit switch LS-1. During this movement, it will be noticed that the flange 61 is moved from the FIG. 5 position through the FIG. 4 position to the FIG. 3 position. As a result, the connecting member 31 will be advanced in a clockwise direction. Since, as has been explained before, the friction members 43 and 48 are in friction-tight engagement with the upper and lower surfaces 28 and 29 of the annular flange 21, the annular ring 32 will be tightly connected to the annular flange 21 and the annulus 18 will be driven therewith. Since the table 23 is fixedly secured to the annulus 18, the table 23 will also be driven for rotation in a clockwise direction.

Figure 3:
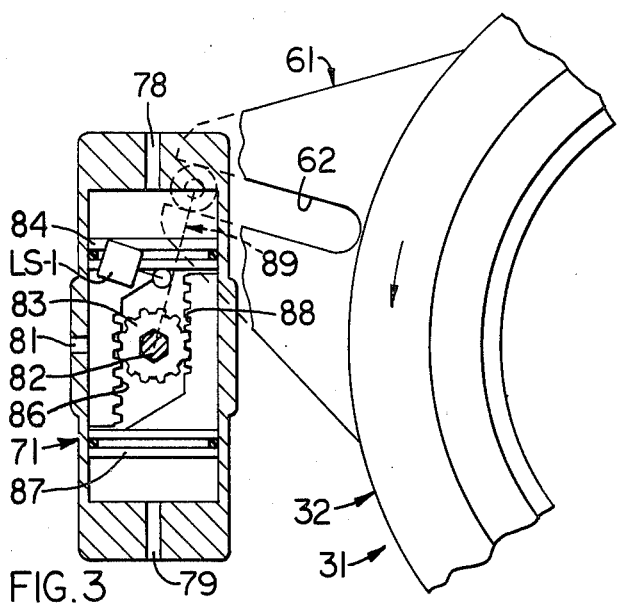
FIG. 3 is a fragmentary sectional view of the drive member and one position of the connecting member.

When the drive mechanism 73 has reached the FIG. 3 position, for example, the limit switch LS-1 effects a shifting of the valve 55 to the left to connect the recesses 41 and 46 on the annular ring 32 to exhaust. As a result, the friction members 43 and 48 will no longer tightly grip the flange 21 therebetween. In addition, the same limit switch LS-1 is utilized for effecting a shifting of the valve 107 to the left to effect a supply of fluid pressure medium through a conduit 104 to the underside of the piston 107 in the locking device 99 to drive the pin 102 upwardly into the recess 103 provided therefor. If the table 23 is properly located, the tapered end of the pin 102 will enter the recess 103 and the limit switch LS-3 will close. If the limit switch LS-3 does not close, no further operations will be performed. A closing of the limit switch LS-3 will start the timer 114 and effect a shifting of the valve 112 to the left due to an energization of the solenoid 129. As a result, pressurized fluid will be supplied to the port 81 in the cylinder 77 and the pistons 84 and 87 will be driven outwardly and the chambers between the pistons 84 and 87 and the axial ends of the cylinder 77 will be connected through the ports 78 and 79 to the exhaust. Thus, the gear 83 will be rotated in a counterclockwise direction and the flange 61 will be moved from the FIG. 3 position through the FIG. 4 position to the FIG. 5 position. As a result, the annular ring 32 will move relative to the annular flange 21 by reason of the nonengagement of the friction members 43 and 48 therewith.

To prevent a movement of the table 23 from the desired indexed position, it is contemplated that the locking device 99 remain activated until the limit switch LS-2 is engaged, after which the closing of the limit switch LS-2 will retract the pin 102 from the recess 103 due to an energization of the solenoid 128 to cause the valve 107 to shift to the right and the position shown in FIG. 7. As a result, a movement of the annular ring 32 from the FIG. 3 position to the FIG. 5 position will not effect a movement of the table 23. Once the drive mechanism 71 is in the FIG. 5 position, the system can remain at rest until the control timer 114 times out and initiates another indexing movement for the table 23 in the same manner as described above.

In order to reverse the drive direction of movement of the table 23, the position of the limit switches LS-1 and LS-2 need only to be reversed. This simplified arrangement permits the device to be utilized in a wide variety of situations. In addition, the stroke can be easily adjusted by moving the mounting plate 72 in the guides provided therefor.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An indexing mechanism, comprising:
   base means;
   cyclical drive means mounted on said base means;
   driven means supported for movement relative to said base means and about an axis of rotation, said driven means having an annular radially extending flange the center of which coincides with said axis of rotation;
   connecting means including an annular ring supported on and for movement relative to said annular flange for connecting said cyclical drive means to said driven means, said connecting means including coupling means movable into and out of engagement with said driven means and centering means for maintaining the center of said annular ring concentric about said axis of rotation; and
   control means for effecting a simultaneous coupling by said coupling means of said drive means to said driven means and a driving of said driven means by said drive means in one direction and a simultaneous uncoupling of said coupling means to uncouple said drive means from said driven means and a driving of said drive means in an opposite direction relative to said driven means.

2. An indexing mechanism according to claim 1, wherein said centering means includes a beveled radial edge on said annular flange;
   wherein said annular ring has a plurality of rotatably support rollers thereon each having an inclined peripheral edge parallel to said beveled radial edge, said rollers engaging said beveled radial edge to effect a centering of said annular ring relative to said axis of rotation of said annular flange.

3. An indexing mechanism according to claim 1, wherein said connecting means includes an annular ring supported on said annular flange, said annular ring having a C-shaped cross section wherein the end legs of said C-shape straddle said annular ring.

4. An indexing mechanism according to claim 3, wherein said coupling means is mounted on said legs of said annular ring and comprises friction members movable into and out of frictional engagement with opposite surfaces of said annular flange.

5. An indexing mechanism according to claim 1, wherein said axis of rotation extends vertically and said annular flange extends horizontally;
   wherein said annular ring has a C-shaped cross section with a pair of parallel legs straddling said annular flange and an interconnecting bight member; and
   wherein said coupling means is mounted on said parallel legs and comprises friction members movable into and out of frictional engagement with opposite surfaces of said annular flange.

6. An indexing mechanism according to claim 5, wherein said legs of said annular ring each have recesses therein adapted to reciprocally support a friction member therein for movement toward and away from one of said opposite surfaces on said annular flange;
   wherein said coupling means further includes pressure medium supply means for supplying pressure medium to one side of said friction member remote from the side engaging said annular flange.

7. An indexing mechanism according to claim 1, including locking means for locking the position of said driven means when said coupling means is uncoupled.

8. An indexing mechanism, comprising:
base means;
cyclical drive means mounted on said base means, said drive means comprising a lever driven about an axis parallel to said axis of rotation, which lever has a roller on the free end thereof rotatable about an axis parallel to said axis of rotation;
driven means supported for movement relative to said base means;
connecting means supported on and for movement relative to said driven means for connecting said cyclical drive means to said driven means, said connecting means including coupling means movable into and out of engagement with said driven means and further including guide means responsive to the movements of said lever and said roller thereon to effect said movement of said connecting means; and
control means for effecting a simultaneous coupling by said coupling means of said drive means to said driven means and a driving of said driven means by said drive means in one direction and a simultaneous uncoupling of said coupling means to uncouple said drive means from said driven means and a driving of said drive means in an opposite direction relative to said driven means.

9. An indexing mechanism according to claim 8, wherein said guide means includes a radial projection on said connecting means having a radial slot therein receiving said roller.

10. An indexing mechanism, comprising:
base means;
cyclical drive means mounted on said base means;
driven means supported for movement relative to said base means;
connecting means supported on and for movement relative to said driven means for connecting said cyclical drive means to said driven means, said connecting means including coupling means movable into and out of engagement with said driven means and defining a slip clutch having a predefined slip threshold to effect slippage if said driven means encounters resistance to movement; and
control means for effecting a simultaneous coupling by said coupling means of said drive means to said driven means and a driving of said driven means by said drive means in one direction and a simultaneous uncoupling of said coupling means to uncouple said drive means from said driven means and a driving of said drive means in an opposite direction relative to said driven means.

11. An indexing mechanism according to claim 10, wherein said driven means includes means supporting said driven means for movement about an axis of rotation and wherein said driven means has means defining a hole extending concentrically with said axis of rotation and through said driven means.

* * * * *